July 17, 1962
C. B. FRANCIS
3,044,852
TREATMENT OF PICKLE LIQUOR SLUDGE
Filed April 27, 1959
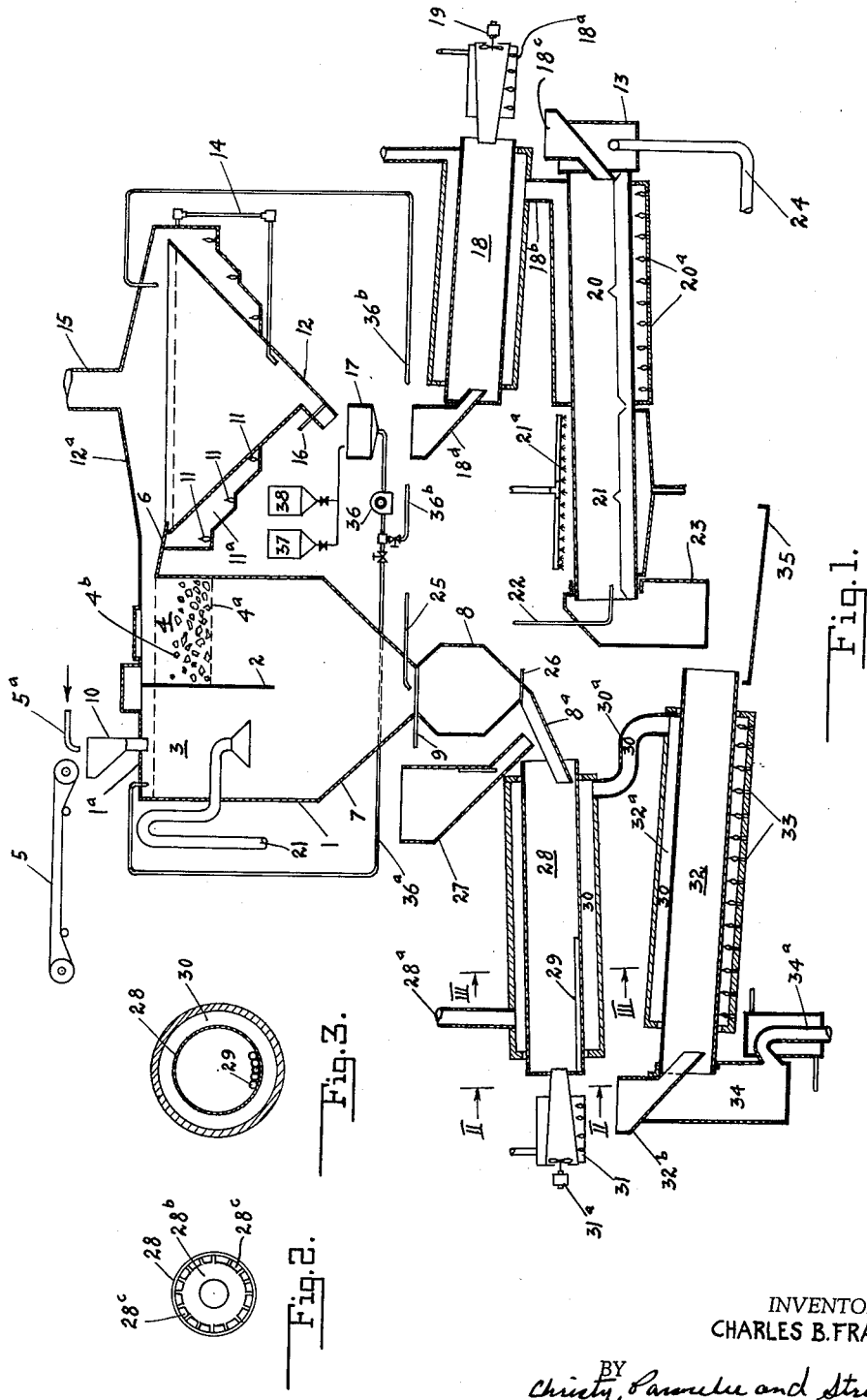
INVENTOR.
CHARLES B. FRANCIS.
BY Christy, Parmelee and Strickland
*his* ATTORNEY.

3,044,852
TREATMENT OF PICKLE LIQUOR SLUDGE
Charles B. Francis, Pittsburgh, Pa., assignor to Puriron and Chemicals, Inc., a corporation of Pennsylvania
Filed Apr. 27, 1959, Ser. No. 809,100
3 Claims. (Cl. 23—110)

This invention relates to the disposal of spent sulfuric pickling acid in such way that harmful pollution of the streams and water-ways of the country is avoided. More particularly, the invention concerns the production of iron powder and sulfuric acid or other sulfur compounds from mixtures of iron oxides, and/or iron hydrates, and calcium sulfate, such as the mixtures of these substances as are obtained by treating spent pickling acid with slaked lime or calcium hydroxide. The invention consists in certain new and useful improvements in method.

Hitherto, the leading method used for the disposal of the 1,000,000 or more gallons of spent pickling acid (commonly known as pickle liquor) daily produced in the United States is first to add slaked lime to the liquor until the mixture becomes slightly alkaline, at which time the calcium hydroxide reacts with both the free acid and ferrous sulfate, thus:

(I)    $H_2SO_4 + Ca(OH)_2 \rightarrow CaSO_4 + 2H_2O$ (II)   $FeSO_4 + Ca(OH)_2 \rightarrow CaSO_4 + Fe(OH)_2$ Air is bubbled through the mixture of water and suspended solids to oxidize the ferrous hydroxide to ferric hydroxide, and then the solids are separated from the water either by filtering or settling to form a so-called acid sludge. The sludge, amounting to some 2,000 net tons obtained from 1,000,000 gallons of pickle liquor, have heretofore been discarded by dumping. The dumping of these solids has been costly and difficult, resulting in the daily loss of recoverable products in the form of more than 250 tons of sulfuric acid, 500 tons of iron, and 800 tons of quick lime (CaO).

It is the object of the present invention to recover these valuable materials, and to reduce the cost of disposing of pickle liquor—indeed, to realize a profit in such disposition.

Exemplary apparatus in which the invention may be practiced is illustrated in the accompanying drawings, wherein:

FIG. 1 is a diagrammatic view of the apparatus, as seen in vertical section;

FIG. 2 is a view in end elevation of a certain drying and grinding unit of the apparatus, as seen on the plane II—II of FIG. 1; and FIG. 3 is a cross sectional view of said unit, as seen on the plane III—III of FIG. 1.

Referring to the drawings, the apparatus comprises a reaction vessel 1, divided by a partition 2 into two communicating chambers 3 and 4, the latter chamber having a number of cross members 4a for supporting a quantity of steel scrap 4b in its upper portion and having near its top a lip or overflow outlet 6. This vessel has a sloping or hopper-like bottom 7 that terminates in a smaller chamber 8, with flow between said hopper-like bottom 7 and chamber 8 controlled by a slide valve 9. In starting the operation of my method the lower chamber 8 is filled with water, and the slide valve 9 is closed, with the water level in the bottom of chamber 1 located about one foot above the said valve 9. Acid sludge, sometimes in the form of filter cake formed from such sludge, is then introduced to chamber 3 by way of a conveyor 5 and a feeding hopper 10, through which hopper the sludge or cake is washed down with sufficient 20° hydrochloric acid to react with the major portion (say 90 to 97%) of the iron hydroxide in the sludge, as follows:

(III)   $Fe(OH)_2 + CaSO_4 + 2HCl$
         $\rightarrow FeCl_2 + CaSO_4 + 2H_2O + 170$ kilo. cal. per g. mol.

(IV)    $Fe(OH)_3$ (if present) $+ 3HCl \rightarrow FeCl_3 + 3H_2O$

The weight and volume of the 20° hydrochloric acid thus introduced to vessel 1 is directly proportional to the amount of ferrous sulfate and free acid in the pickle liquor treated with lime to effect Reactions I and II set forth in the foregoing context. For an hourly flow of 2000 gallons of pickle liquor, that contains 15% $FeSO_4$ and 5% free acid, the amount of 20° HCl to be added per hour is 4327.5 lbs., which equals 60 cu. ft., or 445.8 gallons. The total volume of the vessel, less the volume of the water above slide valve 9 is 1050 cu. ft; however, the 4046 lbs. of $CaSO_4$ formed in the reaction occupies about 24 cu. ft., wherefore twelve hours will be required approximately to fill the vessel. At the end of twelve hours the slide valve 9 is opened, permitting the $CaSO_4$ to settle into the water in compartment 8 which has a volume of 66 cu. ft. As the addition of sludge and 20° HCl into vessel 1 is continued, the substantially saturated solution of ferrous chloride (any ferric chloride present is reduced by the scrap iron 4b) overflows outlet 6 into an evaporator 12, which has a volume of 313 cu. ft., so that the vessel 1 and the evaporator 12 are filled in about fifteen and one-quarter hours.

The effective surface of the evaporator is 156¼ sq. ft., capable of evaporating at least 2500 lbs. of water per hour. The evaporator is equipped with one-hundred and two burners 11 arranged in three circumferential rows in a combustion chamber 11a. Each burner has capacity to burn two cu. ft. of gas per minute. The burners in each row are turned on as the ferrous chloride solution in the evaporator rises one foot above the row, as indicated by the glass gauge 14. The hot products of combustion from chamber 11a are drawn over the top surface of the solution under the effect of draft produced by a stack 15. As the solution is substantially saturated, ferrous chloride begins to be precipitated in about one hour after the solution starts to boil, and within one and one-half hours about 3000 lbs. of the salt will have settled to the bottom of the evaporator. A gate valve 16 is then opened and adjusted to hold the level of liquid in the evaporator to within one foot of the top, while permitting the salt to discharge into a centrifuge 17.

In the centrifuge the salt is thoroughly washed first with a saturated solution of $FeCl_2$ mixed with one-tenth part by volume of 20° HCl, thereby dissolving any $CaSO_4$ present. The wash liquid is returned to reaction chamber 3. Next, the salt is washed with a saturated neutral solution of the salt to remove the entrained acid, and then the latter wash solution is returned to the evaporator. The washing solution of $FeCl_2$ may be drawn as needed from a supply tank 37, while the neutral wash solution may be drawn from a supply tank 38. Transfer of the wash liquids from the centrifuge to the chamber 3 and evaporator 12 is made by pump 36 via lines 36a and 36b, respectively. The wet salt is then discharged from centrifuge 17 into a chute 18d and thence into an inclined rotary dryer kiln 18. As the salt advances left-to-right through the kiln it is dried. Air, preheated to 500° F. in a heater 18a, is forced counter current to the moving salt by means of a fan 19, and promotes the rapid drying of the salt, without any danger of the moisture driven from the salt condensing upon the relatively cool salt entering the kiln. The kiln 18 is heated by the hot products of combustion delivered by a duct 18b from a rotary kiln section 20 that is externally heated by burners 20a.

The dry salt at 300 to 400° F. is delivered from kiln 18 into a chute 18c, and thence enters the kiln section 20 heated by burners 20a. The kiln section 20 is continued in a kiln section 21 cooled by water sprays 21a. Through the cooling kiln section 21 hydrogen, introduced by a feed line 22, flows at the rate of 122 cu. ft. per minute. The reducing kiln section 20 is maintained at a temperature of 1100 to 1400° F., and the ferrous chloride is reduced at a rate of 1076 lbs. per hour, in accordance with the following reaction:

(V) $FeCl_2 + H_2 \rightarrow Fe + 2HCl - 9$ kilo. cal. per g. mol.

The iron powder thus produced flows through the section 21 and is cooled, and then drops into an air-tight receptacle 23, through which ½ cu. ft. of natural gas is passed per minute, to render the iron powder non-pyrophoric at a temperature below 350° F. The 244 cu. ft. of dry HCl gas produced per minute in the reduction of the ferrous chloride, plus the said ½ cu. ft. of natural gas at 600 to 700° F., are drawn off, along with a little air sucked in between the header 13 and the charging end of the reducing kiln section 20. Suction pumps or fans (not shown) may be provided to effect the flow of these gases from the header 13 and through a tube 24 to the chamber 3 of the reaction vessel 1 at a point about three feet below the surface of the solution therein. The HCl gas dissolves in the water of the solution and reacts with the acid sludge, as already shown by Reaction III.

At this stage of the operation the addition of 20° HCl acid to the reaction chamber 3 is arrested, and water at the rate of 300 gallons per hour (2500 lbs.) is admitted through a tube 25 at the bottom of the reaction vessel 1. The 4450 lbs. of HCl gas required hourly in the described example of my invention is obtained by recirculating a portion of the 21,120 lbs. of such gas added to the reaction vessel 1 in the form of 20° HCl solution; that is, the hot HCl gas yielded in the reducing kiln section 20 is returned to the vessel 1, thereby yielding heat to the contents of the vessel. The heat generated by the gas chemically entering the solution in vessel 1 and the heat of the reactions in the vessel are sufficient to raise the temperature of the solution in chamber 3 to the boiling point and thereby to effect the vaporization therefrom of so much of the water (about 1500 lbs.) as exceeds that required to hold in solution the iron chloride salts formed by Reactions III and IV.

The 300 gallons of water per hour admitted through tube 25 rises slowly through the sulfate and serves to hold the concentrated chloride solution near the surface of the sulfate in chamber 3 and prevents the solution from descending with the precipitated calcium sulfate into the chamber 8.

In passing it may be noted that the reaction vessel 1 is enclosed by a cover 1a that may be continuous with the cover 12a of the evaporator, as shown in FIG. 1.

When chamber 8 has become filled with calcium sulfate, which calcium sulfate intentionally includes a small portion of ferrous hydroxide, a slide valve 26 is opened and adjusted in position to permit the calcium sulfate to flow out as rapidly as it descends from chamber 3. As the sulfate flows from chamber 8 into a chute 8a silica sand is added to it at the rate of 1800 lbs. per hour, the sand being delivered from a hopper 27. The mixture of calcium sulfate and silica sand flows from chute 8a into an inclined dryer kiln 28, which is provided in its lower portion with a plurality of steel grinder bars that in this case are 8 ft. in length and 2 in. in diameter. These bars mix and pulverize the materials being processed in the kiln. The grinder bars 29 are retained in the lower end of the kiln 28 by means of an end plate 28b that is peripherally slotted, as at 28c, FIG. 2, to permit the pulverized and dried materials to be discharged from the kiln.

The kiln 28 may be externally heated to 500° F. by the products of combustion drawn, under the effect of a stack 28a, into a muffle chamber 30, via a duct 30a from the heating chamber 32a of a kiln 32 later to be described. Additionally, it is important to note that air, heated by a preheater 31 to about 500° F., is blown through the dryer 28 by a fan 31a. At this temperature the air flows counter to the mixture of calcium sulfate and silica sand advancing right-to-left through the kiln 28, and this heated air not only accelerates the drying of the mixture of calcium sulfate and sand, but also prevents water vapor released in the kiln from condensing on the relatively cool mixture entering the kiln. Furthermore, the oxygen in this heated air reacts with the small portion of ferrous hydroxide that is carried from the reaction vessel 1 along with the calcium sulfate, thus:

(VI) $2Fe(OH)_2 + \frac{1}{2}O_2 \rightarrow Fe_2O_3 + 2H_2O$

From the dryer 28 the mixture of calcium sulfate, sand and a small portion of ferric oxide enters an inclined kiln 32, by way of a chute 32b. The kiln 32 is externally heated to approximately 1400° F. by burners 33, the products of combustion from which are used to heat the dryer 28, as already described. In the kiln 32 the ferric oxide acts as a catalyst in the decomposition of the calcium sulfate in the mixture, and a series of chemical reactions occur, the final results of which may be represented, as follows:

(VII) $CaSO_4 + SiO_2 \rightarrow CaSiO_3 + SO_3$

The upper end of kiln 32 is closed by a header 34 partly filled with a catalyst in the form of compressed cubes of $Fe_2O_3$. The $SO_3$ released from the calcium sulfate is drawn through the catalyst in header 34, by means of a suction fan (not shown) connected to a duct 34a. The catalyst in header 34 oxidizes the traces of $SO_2$ that may be included with the $SO_3$ flowing from kiln 32, whereby substantially all of the sulfur oxide delivered from kiln 28 is in the form of $SO_3$, which may be delivered by a duct 34a to an apparatus in which the $SO_3$ is absorbed in 98% $H_2SO_4$ to form oleum, or disulfuric acid $H_2S_2O_7$, which may be diluted with 60° acid to form 98% sulfuric acid, half of which is recirculated to absorb $SO_3$ and the other half of which is diluted with 50% acid to form 2545 lbs. of 60° sulfuric acid per hour. The several forms of apparatus for forming $H_2SO_4$ from $SO_3$ are well known to those skilled in the chemical art, and it is needless either to illustrate the same, or further to involve this specification therewith.

The mixture of iron oxide and $CaSiO_3$ produced in the kiln 32 is discharged to a mechanical jigger 35, and this jigger serves to remove most of the iron oxide from the $CaSiO_3$. If desired, the iron oxide may be eliminated entirely by passing hydrogen at 700 to 900° F. through the mixture, and then in known way magnetically removing the resultant powdered iron from the $CaSiO_3$. Alternately, this powdered iron may be volatilized as iron carbonyl, $Fe(CO)_5$, by passing carbon monoxide through the mixture of $CaSiO_3$ and powdered iron. The reactions are:

(VIII) $Fe_2O_3 + 3H_2 \rightarrow 2Fe + 3H_2O$ (IX) $Fe + 5CO \rightarrow Fe(CO)_5$ Heated to 400 to 450° F. the iron carbonyl decomposes, thus:

(X) $Fe(CO)_5 \rightarrow Fe + 5CO$

In modification of the apparatus described in exemplary way for the practice of my improved method, it may be mentioned that the dryer kiln 18 for the ferrous chloride delivered from the evaporator 12 may be provided with grinder bars, such as the bars 29 shown in the kiln 28. By virtue of this modification the ferrous chloride prepared for reduction to iron powder in kiln 20 may be pulverized to yield the particle size desired in the powdered iron product.

While in the foregoing specification the calcium sulfate, produced as one of the products obtained by the neutralization of pickle liquor, is treated to produce calcium silicate and sulfur trioxide, it will be understood that the calcium sulfate itself may be used without substantial further treatment as a valuable article of commerce.

Many other variations and modifications of the process described are held within the contemplation of the invention defined in the appended claims.

I claim:
1. In the harmless disposal of spent sulfuric acid produced in steel pickling, the method which comprises neutralizing the spent acid with lime and thereby forming a substantially neutral liquid effluent for disposal and a quantity of sludge comprised of calcium sulfate and iron hydroxides, treating the sludge wtih an aqueous solution of hydrochloric acid sufficient in quantity and concentration to convert the major portion of the iron hydroxides in the sludge into a substantially saturated aqueous solution of iron chloride while leaving a residue of calcium sulfate including a relatively small portion of ferrous hydroxide, separating said residue from the iron chloride solution, effecting the precipitation and separation of particulate ferrous chloride from said solution, driving the contained water from the particulate ferrous chloride, and, by heating the dehydrated ferrous chloride particles in the presence of hydrogen, producing metallic iron with an accompanying release of hydrochloric acid in substantially the amount to provide the hydrochloric acid for treating the quantity of sludge first mentioned, mixing silica sand with the calcium sulfate and residue, drying the mixture in the presence of heat and an oxygen-containing gas and converting the ferrous hydroxide to ferric oxide, and under the influence of heat and the catalytic effect of the ferric oxide recovering the sulfur oxides from the calcium sulfate and converting the residual mixture to calcium silicate.

2. In the harmless disposal of pickle liquors containing sulfuric acid wherein the sulfuric acid is neutralized with lime and the resulting solids are separated as acid sludge comprising calcium sulfate and iron hydroxides, the method of treating said sludge which comprises adding to said sludge an aqueous solution of hydrochloric acid sufficient in quantity and concentration to convert the major portion of the iron hydroxides in the sludge into a substantially saturated aqueous solution of iron chloride while leaving a residue of calcium sulfate including a relatively small portion of ferrous hydroxide, separating said residue from the iron chloride solution, heating said iron chloride solution to evaporate water therefrom and to precipitate particulate ferrous chloride from said solution, separating said particulate ferrous chloride, driving the contained water from the separated particulate ferrous chloride, heating the dehydrated ferrous chloride particles in the presence of hydrogen at a temperature of 1100°–1400° F., thereby producing metallic iron with an accompanying release of hydrochloric acid in substantially the amount to provide the hydrochloric acid for treating the quantity of sludge first mentioned, mixing silica with the said calcium sulfate residue, heating the mixture in the presence of an oxygen-containing gas thereby converting the ferrous hydroxide to ferric oxide, and under the influence of heat and the catalytic effect of the ferric oxide converting the calcium sulfate of the residual mixture to calcium silicate and sulfur oxides, and recovering the sulfur oxides.

3. In the harmless disposal of pickle liquors containing sulfuric acid wherein the sulfuric acid is neutralized with lime and the resulting solids are separated as acid sludge comprising calcium sulfate and iron hydroxides, the method of treating said sludge which comprises adding to said sludge an aqueous solution of hydrochloric acid sufficient in quantity and concentration to convert the major portion of the iron hydroxides in the sludge into a substantially saturated solution of iron chloride while leaving a residue of calcium sulfate including a relatively small portion of ferrous hydroxide, separating said residue from the iron chloride solution, precipitating and separating the particulate iron chloride from said solution, driving the contained water from the separated iron chloride, and, by heating the dehydrated iron chloride particles in the presence of hydrogen, producing metallic iron with an accompanying release of hydrochloric acid in substantially the amount to provide the hydrochloric acid for treating the quantity of sludge first mentioned, mixing silica sand with the calcium sulfate and residue, heating and agitating the mixture in the presence of an oxygen-containing gas at a temperature of about 500° F. to dry the same and to convert the ferrous hydroxide to ferric oxide, further heating the dried mixture to a temperature of about 1400° F. whereby under the catalytic effect of the ferric oxide the calcium sulfate is converted to calcium silicate with the release of sulfur oxides, and recovering the sulfur oxides.

References Cited in the file of this patent

UNITED STATES PATENTS

| | | |
|---|---|---|
| 370,511 | Wigg et al. | Sept. 27, 1887 |
| 1,008,847 | Meyer | Nov. 14, 1911 |
| 1,198,817 | Basset | Sept. 19, 1916 |
| 2,374,453 | Oliver et al. | Apr. 24, 1945 |
| 2,762,700 | Brooks | Sept. 11, 1956 |
| 2,880,062 | Francis | Mar. 31, 1959 |

FOREIGN PATENTS

| | | |
|---|---|---|
| 8,838 | Great Britain | 1885 |
| 3,174 | Great Britain | 1914 |
| 570,881 | Great Britain | July 26, 1945 |